(12) United States Patent
Bieber et al.

(10) Patent No.: US 9,423,576 B2
(45) Date of Patent: Aug. 23, 2016

(54) FIBER OPTIC CABLE CONNECTOR

(75) Inventors: Jorg Bieber, Seeheim-jugenheim (DE); Joachim Hahn, Schmitten (DE); Wolfgang Mueller, Darmstadt (DE)

(73) Assignee: TE Connectivity Germany GmbH, Bensheim (DE)

( * ) Notice: Subject to any disclaimer, the term of this patent is extended or adjusted under 35 U.S.C. 154(b) by 1749 days.

(21) Appl. No.: 12/734,652

(22) PCT Filed: Nov. 7, 2008

(86) PCT No.: PCT/EP2008/065161
§ 371 (c)(1),
(2), (4) Date: May 14, 2010

(87) PCT Pub. No.: WO2009/062894
PCT Pub. Date: May 22, 2009

(65) Prior Publication Data
US 2010/0272400 A1 Oct. 28, 2010

(30) Foreign Application Priority Data

Nov. 16, 2007 (DE) .......................... 10 2007 054 747

(51) Int. Cl.
*G02B 6/38* (2006.01)
*G02B 6/40* (2006.01)

(52) U.S. Cl.
CPC .............. *G02B 6/403* (2013.01); *G02B 6/3855* (2013.01); *G02B 6/3857* (2013.01); *G02B 6/3863* (2013.01)

(58) Field of Classification Search
None
See application file for complete search history.

(56) References Cited

U.S. PATENT DOCUMENTS

| 4,116,655 A * | 9/1978 | Lewis ............................. 65/401 |
| 4,176,909 A * | 12/1979 | Prunier .................. G02B 6/255 156/73.2 |
| 4,261,642 A * | 4/1981 | Lewis et al. ..................... 385/81 |
| 5,045,100 A * | 9/1991 | Smith et al. ..................... 65/410 |
| 5,058,985 A * | 10/1991 | Davenport et al. ........... 385/115 |
| 5,216,735 A | 6/1993 | Rondeau |
| RE35,734 E * | 2/1998 | Rondeau ......................... 385/78 |
| 6,061,490 A * | 5/2000 | Sera et al. ..................... 385/115 |
| 6,078,714 A * | 6/2000 | Cavanaugh ................... 385/115 |
| 6,349,572 B1 * | 2/2002 | Meinl ..................... G02B 6/403 65/409 |
| 6,599,026 B1 * | 7/2003 | Fahrnbauer .......... G02B 6/3862 385/139 |
| 2006/0188212 A1 * | 8/2006 | Oron et al. .................... 385/139 |

FOREIGN PATENT DOCUMENTS

| EP | 0 400 856 A | 12/1990 |
| EP | 1 006 376 A | 6/2000 |
| EP | 1 491 925 A | 12/2004 |
| EP | 1 645 895 A | 4/2006 |

OTHER PUBLICATIONS

International Search Report issued with International Publication No. WO2009/062894 A 1 by the European Patent Office on Mar. 30, 2009.

* cited by examiner

*Primary Examiner* — Hemang Sanghavi
(74) *Attorney, Agent, or Firm* — Faegre Baker Daniels LLP

(57) ABSTRACT

The invention relates to a fiber optic cable connector (1), the fiber optic cable contact (1) having a hot forming zone (100) at a free longitudinal end portion (10) and, at a portion (11) of the fiber optic cable contact (1) remote from the hot forming zone (100), a thermal barrier zone (110), the thermal barrier zone (110) being configured in such a way that it prevents heat from passing from the hot forming zone (100) into a portion of the fiber optic cable contact (1) on the other side of the thermal barrier zone (110).

24 Claims, 4 Drawing Sheets

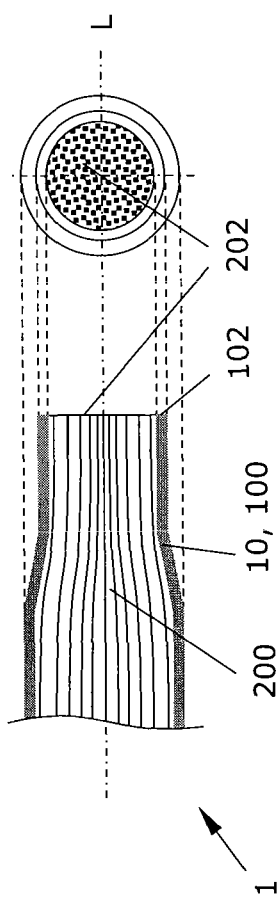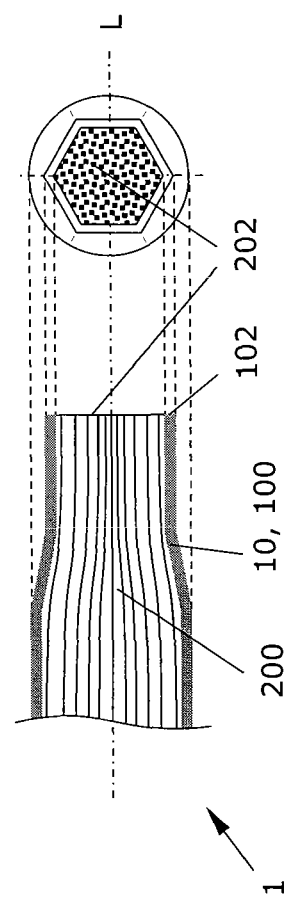

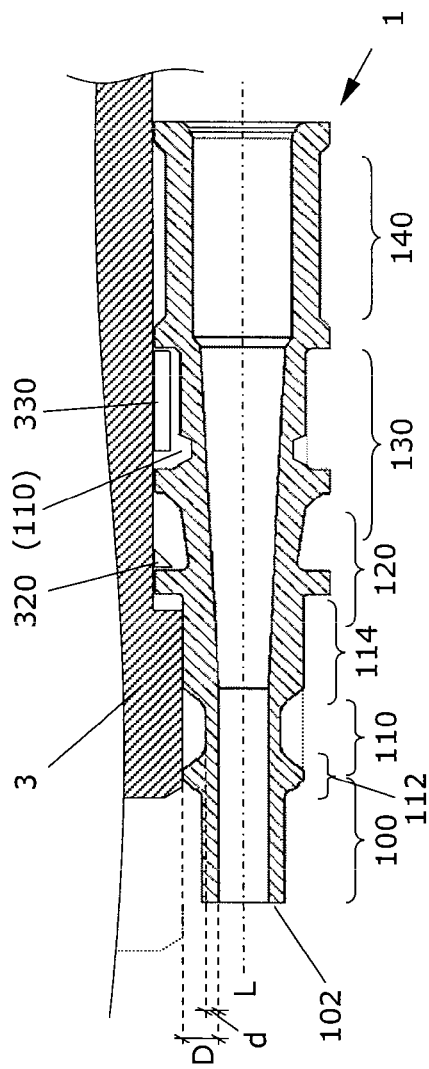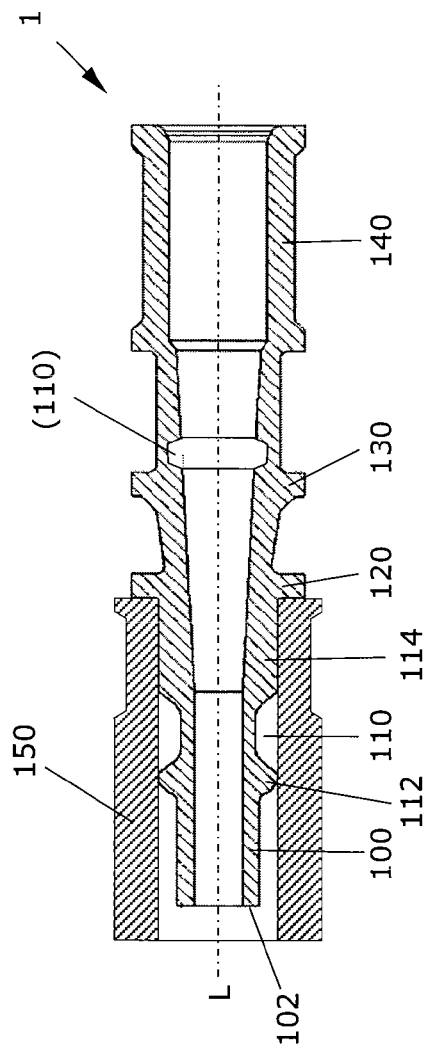

FIBER OPTIC CABLE CONNECTOR

The invention relates to a fiber optic cable connector. The invention further relates to a fiber optic cable connector comprising a fiber optic cable contact according to the invention. Furthermore, the invention relates to a fiber optic cable connector and a ready-made fiber optic cable having a fiber optic cable contact according to the invention, in particular for automotive applications.

In order to optically connect an optical fiber or a fiber optic cable via a corresponding connection to a receiver or another fiber optic cable, a fiber optic cable connector is generally provided in which an optical fiber or a bundle of optical fibers is arranged. The fiber optic cable connector is configured in such a way that it can be coupled to a corresponding fiber optic cable connector. As a result, the optical fiber, or bundle of optical fibers (hereinafter only a bundle of optical fibers is referred to, however the term optical fiber is to be included herein), which is arranged in the fiber optic cable, converges to contact an optical contact with the receiver, another optical fiber, or another bundle of optical fibers.

The end surface of the bundle of optical fibers is fabricated to be as planar as possible, in order to create a minimum loss (low damping) optical surface contact between the bundle of optical fibers and a receiver or another bundle of optical fibers. Depending on the material, it is necessary during a polishing process that a reinforcement sleeve be provided at the end of the bundle of optical fibers. In particular, the reinforcement sleeve should be made of metal, so that during polishing, a free end of the bundle of optical fibers is ground/polished together with the metal sleeve to be planar. This is carried out, in particular, for bundles of glass optical fibers.

The metal sleeve is fixed to the bundle of optical fibers by heating the metal sleeve and the respective longitudinal end portion of the bundle of optical fibers to a forming temperature of the material used for the bundle of optical fibers. Furthermore, a mechanical force is exerted on the metal sleeve and on the longitudinal end portion of the bundle of optical fibers. Consequently, the metal sleeve and the longitudinal end of the bundle of optical fibers are pressed during hot forming of the individual optical fibers into a pack, having a hexagonal (prismatic) to round (cylindrical) cross-section. The metal sleeve preferably forms a fixed connection with the longitudinal end portion of the bundle of optical fibers in order to be able to be subsequently polished.

In order to optically connect the bundle of optical fibers to a corresponding element (receiver/transmitter, fiber optic cable), it is necessary to provide the bundle of optical fibers in the fiber optic cable connector with a plug-in connector. From a constructional point of view, it is rather complex to arrange the fiber optic cable in a housing of the connector since the housing must cover both the metal sleeve and a sheathing of the bundle of optical fibers, which is provided separately from the metal sleeve. Therefore, the sheathing should first be connected to the metal sleeve before connection to the optic cable connector.

In order to mechanically connect the sheathing of the bundle of optical fibers to the metal sleeve, it is necessary, according to the state of the art, to use multi-part fiber optic cable contacts for connectors. A one-piece fiber optic cable contact would destroy the sheathing because of the high temperature present when a pack is formed of the metal sleeve and the longitudinal end portion of the bundle of optical fibers.

DE 10 2005 043 787 A1 discloses a three-part fiber optic cable contact for connecting a fiber optic cable. A bundle of optical fibers, at a longitudinal end portion, are hot pressed together with a metal sleeve to form a pack, which is then received inside a contact element of the fiber optic cable contact. Further, a clamping element clamps a sheathing of the bundle of optical fibers to the contact element in a portion arranged just behind the contact element.

An object of the invention is to provide an improved fiber optic cable connector. A further object of the invention is to provide an improved fiber optic cable connector and an improved ready-made fiber optic cable comprising a fiber optic cable contact according to the invention.

The fiber optic cable contact according to the invention should be produced with fewer parts than currently known in the art. Preferably, it should be possible that both a hot forming zone and a zone for fixing a sheathing of the bundle of optical fibers be provided on a single component, in particular the fiber optic cable contact itself. The hot forming zone is provided for fixing a longitudinal end portion of a bundle of optical fibers. Furthermore, it should be possible to connect the fiber optic cable to the fiber optic cable contact as quickly, simply and cost-effectively as possible. Both the fiber optic cable contact, suitable for a fiber optic cable connector, or a ready-made fiber optic cable are also capable of being produced as quickly, simply and cost-effectively as possible.

The object of the invention is achieved by a fiber optic cable connector according to claim 1. The object of the invention is further achieved by a fiber optic cable connector and a ready-made fiber optic cable comprising a fiber optic cable contact according to the invention according to either claim 11 or claim 12.

A fiber optic cable contact according to the invention for a fiber optic cable comprises, at a free longitudinal end portion, a hot forming zone which is provided for fixing an optical fiber or a bundle of optical fibers of the fiber optic cable on or in the fiber optic cable contact. According to the invention, a thermal barrier zone is connected to the hot forming zone, in a longitudinal direction of the fiber optic cable contact. The thermal barrier zone prevents the transportation of the heat, during a hot forming process, from the hot forming zone to the rest of the fiber optic cable contact or in the direction of a casing-crimping zone of the fiber optic cable contact.

Since the thermal barrier zone is provided on/in the fiber optic cable contact, between the hot forming zone and another or the other portion of the fiber optic cable contact, it is possible to reduce the number of parts, which leads to cost benefits. Furthermore, damage to or destruction of a sheathing of the fiber optic cable is prevented because of the reduction in heat to the rest of the fiber optic cable contact. Consequently, the production time is reduced since the hot forming zone can be heated more quickly to a forming temperature.

In preferred embodiments of the invention, the fiber optic cable contact is symmetrical, in particular rotationally symmetrical and/or naturally integral. Furthermore, the fiber optic cable contact is preferably a turned, cast, or bent part made of metal or a metal alloy.

According to the invention, several other advantages result in addition to the advantages mentioned above. Since the fiber optic cable contact is preferably integral, it may be produced more cheaply and manufactured more quickly, resulting in cost benefits. Furthermore, the fiber optic cable contact is preferably rotationally symmetrical and is also preferably free of any undercut, resulting in quicker production time. In particular, production time is cut when the fiber optic cable contact is produced as a turned or cast part.

In embodiments of the invention, the fiber optic cable contact is constructed to be compatible with the MOST (media oriented systems transport) standard, which is used in the automotive industry. In this context, it may be sufficient for the fiber optic cable contact to have a contour similar to that of a MOST contact. By using this type of contour, the housing of the MOST product family can be accessed. It is then possible to use both a primary and a secondary locking device (contact lock), where the fiber optic cable contacts are capable being removed in the respective housing.

In embodiments of the invention, the thermal barrier zone is connected directly to the hot forming zone on/in the fiber optic cable contact. Consequently, it is possible to limit the heating of the fiber optic cable contact to a forming temperature exclusively, or almost exclusively, to the hot forming zone. In particular, it is possible to reduce the production cycle time for producing the rigid connection between the bundle of optical fibers and the fiber optic cable contact. Furthermore, in preferred embodiments of the invention, the thermal barrier zone is arranged to be remote from a fixing or casing-crimping zone. This region being heated as little as possible through thermal conduction within the fiber optic cable contact, effectively preventing damage to the sheathing.

In embodiments of the invention, the thermal barrier zone is configured as a channel or a groove on/in the fiber optic cable contact. It is preferred that the channel or groove surround the fiber optic cable contact at least in part, but preferably completely. More particularly, the channel or groove ends should merge into each other, i.e. it is not provided spirally in the fiber optic cable contact. Regarding rigidity, a spiral configuration of the groove is possible, but preferred only if the spiral surrounds the fiber optic cable contact more than once. According to the invention, the configuration of the thermal barrier zone is an annular groove on/in the fiber optic contact. It is then possible to achieve a simple and material-saving embodiment of the fiber optic cable contact, it also being possible for the fiber optic cable contact to be integral.

In embodiments of the invention, an annular collar is arranged between the thermal barrier zone and the hot forming zone. The diameter of this collar is preferably the same size as the diameter of a portion of the fiber optic cable contact in a region remote from both the hot forming zone and the thermal barrier zone. On the one hand, the fiber optic cable contact is consequently fixed into place in a housing. On the other hand, it is easier to mount a sleeve on the fiber optic cable contact (see also below).

According to the invention, it is possible to provide or to form one or more thermal barrier zones on/in the fiber optic cable contact. It is possible to provide the thermal barrier zones outside or even inside the fiber optic cable contact. Preferably, the thermal barrier zone is provided between the hot forming zone and the casing-crimping zone of the fiber optic cable contact. In this case, depending on shape and requirements, the thermal barrier zone is preferably provided as close as possible to the hot forming zone and as far away as possible from the casing-crimping zone on/in the fiber optic cable contact. However, it is also possible in embodiments of the invention to be able to form the thermal barrier zone in the direction of the casing-crimping zone should it be necessary, due to constructional and/or procedural conditions.

On the one hand, the present invention provides reduction of the fiber optic cable contact cross-section or wall thickness in the region of the thermal barrier zone to such an extent that the rest of the fiber optic cable contact does not become too hot when the hot forming zone is hot formed. On the other hand, the thermal barrier zone should not weaken the fiber optical cable contact in such a manner that it is impossible for the contact to be damaged during hot forming, or during a preceding and subsequent production step and during use.

According to the invention, the fiber optic cable contact is suitable as a fiber optic cable pin contact. By surrounding the shaped hot forming zone with a sleeve, a fiber optic cable socket contact is produced. By providing the fiber optic cable contact or the fiber optic cable socket contact inside a housing, preferably inside a plastic material housing, a fiber optic cable connector is produced. The fiber optic cable contact or the fiber optic cable connector, and a fiber optic cable form a ready-made fiber optic cable according to the invention.

Further embodiments of the invention will emerge from the other dependent claims.

The invention will be explained hereinafter in greater detail with reference to embodiments referring to the appended drawings, in which:

FIG. 1 shows sectional views of a longitudinal end portion of a bundle of optical fibers with a surrounding fiber optic cable contact in a region of a hot forming zone, the sectional views being taken longitudinally and transversely to a longitudinal axis of the fiber optic cable contact after a hot forming process for forming a cylindrical pack;

FIG. 2 is a view similar to that of FIG. 1, the hot forming zone of the fiber optic cable contact being hot formed into a prismatic pack;

FIG. 5 is a sectional view along the longitudinal axis of a fiber optic cable connector according to the invention with a partial view of a housing;

FIG. 6 is a sectional view along the longitudinal axis of a fiber optic cable connector according to the invention.

Figure 3:
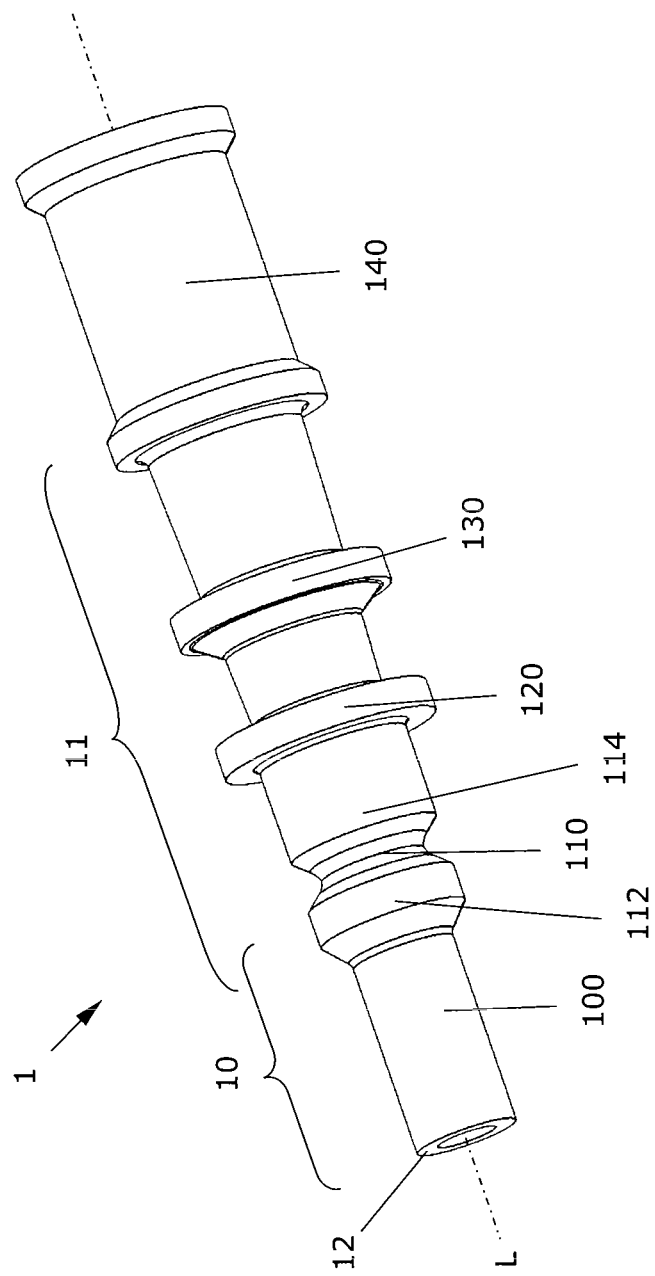
FIG. 3 is a perspective view of a fiber optic cable contact according to the invention before the assembly of a fiber optic cable.

The invention is explained in greater detail hereinafter with reference to a fiber optic cable connector, wherein the fiber optic cable contact is compatible with the MOST (media oriented systems transport) standard. In other words, the fiber optic cable contact makes use of, in particular, an optical coupling for multimedia applications in a motor vehicle, including the audio, video, voice and data signals being transferred over a series bus system via optical fibers. However, the invention should not be limited to such a field of application, but may comprise general contacts, contact and bonding means, connectors and the like for fiber optic cables. In this case, the fiber optic cable may comprise a single optical fiber or a bundle of optical fibers, also known as multi-core optical fibers.

A hot forming process, for producing an optical fiber termination between a fiber optic cable contact 1 and a bundle of optical fibers 200 of a fiber optic cable 2, (see FIG. 4) is described in more detail with reference to FIGS. 1 and 2. In this case, FIGS. 1 and 2 show the state of the optical fiber termination after the hot forming process has been carried out, in which loose individual fibers of the bundle of optical fibers 200 are rigidly connected to one another to form a compact pack. Hereinafter, the term bundle of optical fibers 200 will include the concept of an individual optical fiber 200.

The fiber optic cable 2 which is free at a free longitudinal end portion from a sheathing 210 (see FIG. 4) is inserted from behind into the inner hollow (see FIGS. 5 and 6) fiber optic cable contact 1, the free bundle of optical fibers 200 being inserted snugly into a hot forming zone 100 of the fiber optic cable contact 1. The hot forming zone 100 or the fiber optic cable contact 1 has enough heat resistance for a forming temperature of the bundle of optical fibers 200.

In order to facilitate threading and forwarding of the free bundle of optical fibers 200 into the hot forming zone 100, the fiber optic cable contact 1 has, in its inner middle portion, a slightly narrowed contour. In contrast, at its two longitudinal end portions arranged on either side (hot forming zone 100, casing-crimping zone 140), the fiber optic cable contact 1 preferably has a constant inner diameter which is larger in the region of the casing-crimping zone 140 than in the region of the hot forming zone 100.

In order to produce the pack, which is formed in the hot forming zone 100 and the free longitudinal end portion of the bundle of optical fibers 200, the hot forming zone 100 or the fiber optic cable contact 1 is inserted into a mechanical clamping device and thus held in an axial and/or radial direction. Subsequently, the hot forming zone 100, together with the inserted bundle of optical fibers 200, is heated to a forming temperature of the optical fibers of the bundle of optical fibers 200. In this case, the hot forming zone 100 is preferably heated by means of a forming tool, which may engage with the hot forming zone 100 at an end face and/or laterally.

Consequently, the heated free end portion is deformed in the region of its hot forming zone 100, during deformation of the optical fibers of the bundle of optical fibers 200, to form a pack having an annular cross-section (FIG. 1) or a hexagonal cross-section (FIG. 2). In this case, an outer contour of the hot forming zone 100 or the fiber optic cable contact 1 is also correspondingly deformed, resulting in a cylindrical (FIG. 1) or a prismatic (FIG. 2) pack formed of the hot forming zone 100 and the bundle of optical fibers 200.

Lastly, the deformed longitudinal end portion of the bundle of optical fibers 200 or the fiber optic cable contact 1 is cooled, preferably still with the forming tool near the hot forming zone 100. After sufficient cooling, the fiber optic cable contact 1 is formed with the bundle of optical fibers 200, which are arranged at the hot forming zone 100 of the contact. It is possible to use the hot forming process to form other front cross-sections of the fiber optic cable contact 1 and the bundle of optical fibers 200 than those shown.

Subsequently, an end face 102, 202 of the fiber optic cable contact 1 or the bundle of optical fibers 200 is machined and thus brought to a specific length. The specific length of the fiber optic cable contact 1 is necessary so there is enough space for the contact in a housing 3 (see FIG. 5) or so the contact can be inserted far enough into a housing 3 of a counter plug or into a receptacle of a means or a device.

High temperatures are necessary for processing the bundle of optical fibers 200. Both, the hot forming zone 100 and the bundle of optical fibers 200, are heated to the forming temperature of the optical fibers. A thermal barrier zone 110 is provided, at a suitable location inside the fiber optic cable contact 1, to negate too much heat from flowing through or passing into the rest of the fiber optic cable contact 1.

On the one hand, the thermal barrier zone 110 ensures that the entire fiber optic cable contact 1 is not heated to the forming temperature during the forming process, preventing energy and production time from being wasted. On the other hand, the thermal barrier zone 110 ensures that the sheathing 210 of the fiber optic cable 2, which can be crimped at the casing-crimping zone 140 of the fiber optic cable contact 1, is not damaged during the forming process, i.e. is not melted.

In this case, the sheathing 210 may be held or fixed between the bundle of optical fibers 200 and an inner face of the fiber optic cable contact 1 by crimping the casing-crimping zone 140, before or after the forming process.

Figure 4:
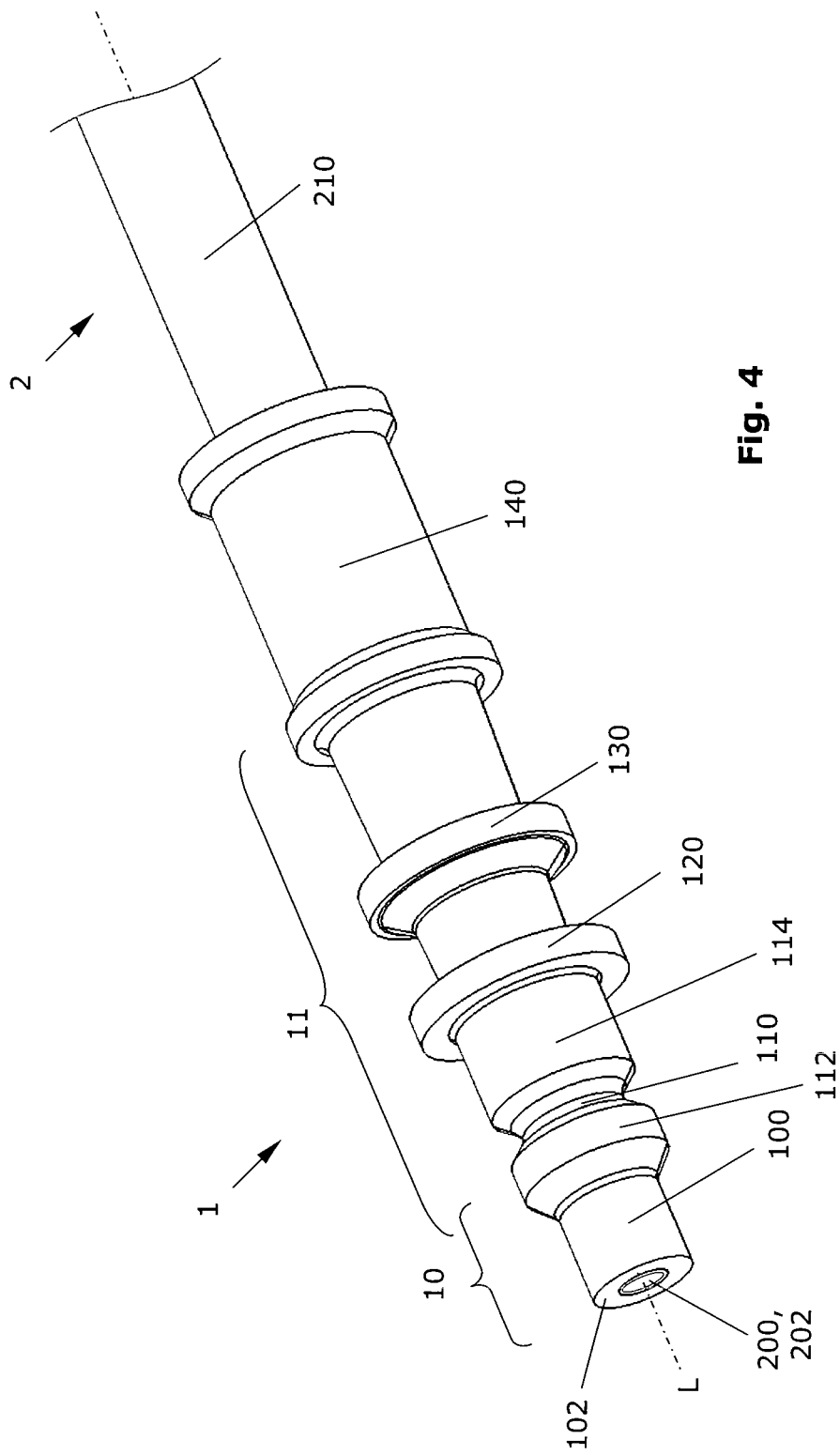
FIG. 4 is a perspective view of the fiber optic cable contact according to the invention after assembly of the fiber optic cable and after the shaping of an end face of the fiber optic cable contact.

In an embodiment, shown in FIGS. 3 and 4, the hot forming or hot working zone 100 is provided at a free longitudinal end portion 10 of the fiber optic cable contact 1. The free longitudinal end portion 10 is connected to a middle region 11 or a region 11 of the fiber optic cable contact 1, which is arranged away from the free longitudinal end portion 10. Optionally, the middle region 11 may overlap the free longitudinal end portion 10 in the longitudinal direction L of the fiber optic cable contact 1. Then, the housing crimping zone 140 of the fiber optic cable contact 1 is preferably connected to this middle region 11 in the longitudinal direction L, on an opposite side of the middle region to where the free longitudinal end portion 10 is connected.

The thermal barrier zone 110 is provided to be preferably adjacent, in particular directly adjacent, to the hot forming zone 100 externally in the middle region 11 of the fiber optic cable contact 1. In the present embodiment, the hot forming zone 100 is provided to be adjacent to the thermal barrier zone 110 at a front longitudinal end portion of the fiber optic cable contact 1, and a front shoulder 112 or a front collar 112 preferably being arranged between the thermal barrier zone 110 and the hot forming zone 100.

In the present embodiment, the thermal barrier zone 110 is configured as a thermal stop groove or a thermal stop channel surrounding the fiber optic cable contact 1 at least in part, and is configured so as to be preferably symmetrical or rotational symmetrical. In other words, the peripheral wall thickness of the fiber optic cable contact 1 is reduced, at least in portions (D-d), in the region of the thermal barrier zone 110 as shown in FIG. 5.

Preferably, the wall thickness d of the fiber optic cable contact 1 is approximately 15 to 85%, in particular approximately 25 to 75%, smaller in a region of the thermal barrier zone 110 than the wall thickness D of the fiber optic cable contact 1 in a region directly adjacent to the thermal barrier zone 110. Considering the mechanical load of the fiber optic cable contact 1, there is a limit to the amount of material removed to create the groove in the region of the thermal barrier zone 110. When the thermal barrier zone 110 is configured as a peripheral recess, a rear shoulder 114 or a rear collar 114 is needed, of which the diameter D preferably corresponds to the diameter D of the front collar 112.

Further behind the rear shoulder 114 or collar 114, in the longitudinal direction L of the fiber optic cable contact 1, and away from the thermal barrier zone, is a primary locking zone 120 and attached thereto is a secondary locking zone 130 of the fiber optic cable contact 1. In this case, it is preferable for the respective locking zones 120, 130 to be configured as an at least partially peripheral locking shoulder or an at least partially peripheral locking collar. Locking elements 320, 330 for the primary 120 and secondary 130 locking zones can be seen schematically in FIG. 5.

A housing crimping zone 140 is attached to the secondary locking zone 130, further along the longitudinal direction L of the fiber optic cable contact 1. Preferably, the fiber optic cable contact 1 has a constant outer diameter, in the region of the housing crimping zone 140, which in turn comprise a shoulder or a collar. The outer diameter should preferably correspond to the outer diameter of both the primary 120 and secondary 130 locking zones.

The zones 100, 110, 120, 130 and 140 of the fiber optic cable contact 1, as well as the configuration of the fiber optic cable contact 1, in the region of its free longitudinal end portion 10 and its middle region 11, are arranged depending on the construction of the housing 3.

FIG. 4 shows the fiber optic cable contact 1, with a fiber optic cable 2, attached thereto after finishing, both cleaving and polishing operations finish the defined optical end face 102, 202. After the forming procedure of the hot forming zone 100 and crimping (not shown in the figure) of the housing crimping zone 140, of the fiber optic cable contact 1. Subsequently, the fiber optic cable contact 1 may be inserted into the housing 3, in particular a plastic material housing 3, as is shown in a partial cross-section in FIG. 5.

FIG. 5 shows the fiber optic cable contact 1 sectioned in its longitudinal direction L, and locked at its upper side in the housing 3. In this case, the fiber optic cable contact 1 is locked in the housing 3 by the primary 320 and secondary 330 locking elements. The primary locking element 320 is configured as a latch inside the housing 3 in one piece or integrally therewith. The secondary locking element 330 is preferably a contact lock 330, which can be inserted externally into the housing 3. It is also possible to exchange these functions or to configure each of the primary 320 and secondary 330 locking elements each as an integral latch 320 or each as an external contact lock 330. Stop shoulders or the like may be used instead of notches 320.

FIG. 5 also shows a second thermal barrier zone (110). In this case, the reference numeral being placed within brackets in order to clarify that this second thermal barrier zone (110) is optional. In this case, the second thermal barrier zone (110) is in turn provided between the casing-crimping zone 140 and the hot forming zone 100, or between the casing-crimping zone 140 and the first thermal barrier zone 110. Furthermore, the distribution of the individual zones 100, 110, 120, 130, 140 and portions 112, 114 is shown in FIG. 5 with curly brackets. In this case, the respective zones 100, 110, 120, 130, 140 and portions 112, 114 may overlap in regions. Furthermore, in FIG. 5 a dotted line can be seen at the first thermal barrier zone 110.

FIG. 6 shows two further embodiments of the invention. A fiber optic cable socket contact 1 can be produced from the fiber optic cable contact 1 of FIGS. 3 to 5. For this purpose, a sleeve 150 is slid onto the free longitudinal end portion 10 of the fiber optic cable contact 1 and fixed thereto. In the process, the sleeve 150 preferably abuts a collar of the primary locking zone 120. It is particularly preferable in this case for the collar 112 and the collar 114 to have the same diameter D (see FIG. 5). The sleeve 150 preferably extends beyond the free end of the fiber optic cable contact 1 in such a way that the end face thereof 102, 202 is arranged inside the fiber optic cable socket contact 1.

FIG. 6 further shows a thermal barrier zone (110) arranged inside, which also extends completely inside the fiber optic cable contact 1 and may also be configured as shown above. This is optional, so the respective reference numeral is given in brackets. It is possible to provide only a single thermal barrier zone (110) that is arranged inside, and to provide no thermal barrier zone (110) outside.

According to the invention, numerous embodiments of the fiber optic cable contact 1 are possible. The fiber optic cable contact 1 is preferably a symmetrical, in particular rotationally symmetrical, component, which is preferably a turned, cast or bent part. The fiber optic cable contact 1 is preferably configured integrally, in particular materially integrally. Furthermore, the sheathing 210 is crimped by means of a four-jaw crimp. It is also possible to produce asymmetrical or multi-part fiber optic cable contact 1 according to the invention. Furthermore, another type of crimp, which is not a four jaw crimp may also be used.

The invention claimed is:

1. Fiber optic cable connector to be secured to a plurality of optical fibers, wherein a fiber optic cable contact has a body with an open interior, the body including a hot forming zone at a free longitudinal end portion of the body, the hot forming zone being in direct contact with the plurality of optical fibers, and, at a middle region of the fiber optic cable contact away from the hot forming zone, a thermal barrier zone of the body, the thermal barrier zone being configured in such a way that it prevents heat from passing from the hot forming zone into a portion of the body of the fiber optic cable contact on the other side of the thermal barrier zone of the body, wherein the open interior of the body is adapted to receive the plurality of optical fibers.

2. Fiber optic cable contact according to claim 1, wherein the thermal barrier zone is provided on/in the fiber optic cable contact adjacent to the hot forming zone.

3. Fiber optic cable according to claim 1, wherein the thermal barrier zone is configured as an at least partially peripheral thermal stopping groove which reduces the diameter of the fiber optic cable contact.

4. Fiber optic cable contact according to claim 1, wherein the wall thickness (d) of the fiber optic cable contact in a portion of the thermal barrier zone is approximately 20 to 30% thinner than the wall thickness (D) of the fiber optic cable contact in a portion directly adjacent to the thermal barrier zone.

5. Fiber optic cable contact according to claim 1, wherein a peripheral shoulder is formed on/in the fiber optic cable contact between the hot forming zone and the thermal barrier zone.

6. Fiber optic cable contact according to claim 1, wherein the thermal barrier zone is provided on/in the fiber optic cable contact between the hot forming zone and a casing-crimping zone of the fiber optic cable contact.

7. Fiber optic cable contact according to claim 1, wherein the fiber optic cable contact comprises a plurality of thermal barrier zones.

8. Fiber optic cable contact according to claim 1, wherein the fiber optic cable contact is configured integrally in particular as a turned, cast or bent part.

9. Fiber optic cable contact according to claim 1, wherein the fiber optic cable contact has a profile, which is compatible with the MOST standard.

10. Fiber optic cable contact, according to claim 1, wherein the fiber optic cable contact comprises a sleeve at its free longitudinal end portion.

11. The fiber optic cable contact of claim 1, wherein the wall thickness (d) of the fiber optic cable contact in a portion of the thermal barrier zone is approximately 35 to 40% thinner than the wall thickness (D) of the fiber optic cable contact in a portion directly adjacent to the thermal barrier zone.

12. The fiber optic cable contact of claim 1, wherein the wall thickness (d) of the fiber optic cable contact in a portion of the thermal barrier zone is approximately 45 to 50%, thinner than the wall thickness (D) of the fiber optic cable contact in a portion directly adjacent to the thermal barrier zone.

13. The fiber optic cable contact of claim 1, wherein the wall thickness (d) of the fiber optic cable contact in a portion of the thermal barrier zone is approximately 55 to 50% thinner than the wall thickness (D) of the fiber optic cable contact in a portion directly adjacent to the thermal barrier zone.

14. The fiber optic cable contact of claim 1, wherein the wall thickness (d) of the fiber optic cable contact in a portion of the thermal barrier zone is approximately 70 to 80% thinner than the wall thickness (D) of the fiber optic cable contact in a portion directly adjacent to the thermal barrier zone.

15. The fiber optic cable contact of claim 1, further comprising a primary locking shoulder and a casing-crimping zone, the thermal barrier zone is configured as a peripheral thermal stopping groove which is positioned between the hot forming zone and the primary locking shoulder, the thermal stopping groove is also positioned between the hot forming zone and the casing-crimping zone.

16. The fiber optic cable contact according to claim 1, wherein the open interior of the body includes a middle portion having a narrowed inner contour.

17. The fiber optic cable contact according to claim 1, wherein the open interior of the body includes a first longitudinal portion having a first constant inner contour, a second longitudinal portion having a second constant inner contour, and a middle portion positioned between the first longitudinal portion and the second longitudinal portion, the middle portion having a narrowed inner contour including a transverse extent less than a traverse extent of the second constant inner contour.

18. The fiber optic cable contact according to claim 17, wherein the first longitudinal portion is between a longitudinal end of the body and the middle portion and the thermal barrier zone is positioned between the longitudinal end of the body and the middle portion, the first longitudinal portion including the hot forming zone.

19. Fiber optic cable connector to be secured to a plurality of optical fibers for automotive applications, comprising:
   a housing; and
   a fiber optic cable contact having a body with an open interior, the body including a hot forming zone at a free longitudinal end portion of the body, the hot forming zone being in direct contact with the plurality of optical fibers, and, at a middle region of the fiber optic cable contact away from the hot forming zone, a thermal barrier zone of the body, the thermal barrier zone being configured in such a way that it prevents heat from passing from the hot forming zone into a portion of the body of the fiber optic cable contact on the other side of the thermal barrier zone of the body, wherein the open interior of the body is adapted to receive the plurality of optical fibers.

20. The fiber optic connector of claim 19, wherein the housing is a plastic housing.

21. The fiber optic connector of claim 19, further comprising a primary locking shoulder and a casing-crimping zone, the thermal barrier zone is configured as a peripheral thermal stopping groove which is positioned between the hot forming zone and the primary locking shoulder, the thermal stopping groove is also positioned between the hot forming zone and the casing-crimping zone.

22. A ready-made fiber optic cable to be secured to a plurality of optical fibers for automotive applications, comprising:
   a housing;
   a fiber optic cable including a plurality of optical fibers; and
   a fiber optic cable contact having a body with an open interior to receive the plurality of optical fibers, the body including a hot forming zone at a free longitudinal end portion of the body, the hot forming zone being in direct contact with the plurality of optical fibers, and, at a middle region of the fiber optic cable contact away from the hot forming zone, a thermal barrier zone of the body, the thermal barrier zone being configured in such a way that it prevents heat from passing from the hot forming zone into a portion of the body of the fiber optic cable contact on the other side of the thermal barrier zone of the body, the fiber optic cable contact being received by the housing.

23. The ready made fiber optic cable of claim 22, wherein the housing is a plastic housing.

24. The ready made fiber optic cable of claim 22, further comprising a primary locking shoulder and a casing-crimping zone, the thermal barrier zone is configured as a peripheral thermal stopping groove which is positioned between the hot forming zone and the primary locking shoulder, the thermal stopping groove is also positioned between the hot forming zone and the casing-crimping zone.

* * * * *